(12) United States Patent
Nabar et al.

(10) Patent No.: US 8,958,503 B1
(45) Date of Patent: *Feb. 17, 2015

(54) DEMODULATION THAT ACCOUNTS FOR CHANNEL ESTIMATION ERROR

(71) Applicant: Marvell International Ltd., Hamilton (BM)

(72) Inventors: Rohit U. Nabar, Sunnyvale, CA (US); Arul Durai Murugan Palanivelu, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/097,856

(22) Filed: Dec. 5, 2013

Related U.S. Application Data

(63) Continuation of application No. 12/569,420, filed on Sep. 29, 2009, now Pat. No. 8,605,831.

(60) Provisional application No. 61/105,581, filed on Oct. 15, 2008.

(51) Int. Cl.
*H04L 27/00* (2006.01)
*H04L 1/00* (2006.01)
*H04L 25/02* (2006.01)

(52) U.S. Cl.
CPC ............ *H04L 1/0054* (2013.01); *H04L 25/024* (2013.01)
USPC ............ 375/324; 375/260; 375/267; 375/341

(58) Field of Classification Search
USPC ........................ 375/260, 267, 316, 341, 324
See application file for complete search history.

(56) References Cited

U.S. PATENT DOCUMENTS

2006/0045200 A1* 3/2006 Bocquet .................. 375/267
2006/0062322 A1* 3/2006 Namgoong et al. ......... 375/285
2006/0215781 A1* 9/2006 Lee et al. .................. 375/267
2008/0019331 A1  1/2008 Thomas et al.

(Continued)

OTHER PUBLICATIONS

IEEE Std 802.16/2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, Oct. 1, 2004.

(Continued)

*Primary Examiner* — Freshteh N Aghdam

(57) ABSTRACT

A method includes determining a mean square error $\sigma_h^2$ of an estimate h of a communication channel, and receiving a data symbol y. The received data symbol y corresponds to a data symbol x transmitted over the communication channel. The method also includes determining a likelihood value for a bit in the transmitted data symbol x. Determining the likelihood value for the bit in the transmitted data symbol x includes calculating a quantity according to $$e^{\frac{-|y-hx|^2}{\sigma_z^2+\sigma_h^2|x|^2}},$$

where $\sigma_z^2$ is a noise power associated with the communication channel. The method also includes calculating the likelihood value for the bit in the transmitted data symbol x as a function of the calculated quantity.

20 Claims, 10 Drawing Sheets

(56) References Cited

U.S. PATENT DOCUMENTS

| | | | |
|---|---|---|---|
| 2009/0141835 A1* | 6/2009 | Yang et al. | 375/341 |
| 2010/0067596 A1* | 3/2010 | Park et al. | 375/262 |
| 2013/0121448 A1* | 5/2013 | Hui et al. | 375/346 |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

S. A. Mujtaba, "IEEE P802.11—Wireless LANS, TGn Sync Proposal Technical Specification," *The Institute of Electrical and Electronics Engineers, Inc.*, doc.: IEEE 802.11-04/0889r6, May 2005.

\* cited by examiner

DEMODULATION THAT ACCOUNTS FOR CHANNEL ESTIMATION ERROR

CROSS-REFERENCE TO RELATED APPLICATIONS

This application is a continuation of U.S. patent application Ser. No. 12/569,420 (now U.S. Pat. No. 8,605,831), entitled "Demodulation that Accounts for Channel Estimation Error" and filed on Sep. 29, 2009, which claims the benefit of U.S. Provisional Patent Application No. 61/105,581, entitled "Optimal LLR Calculation Based on Semi-Coherent Detection" and filed on Oct. 15, 2008. The disclosures of the above-identified patent applications are hereby incorporated herein by reference.

FIELD OF TECHNOLOGY

The present disclosure relates generally to communication systems and, more particularly, to demodulation that accounts for channel estimation error.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or higher data rate, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" standards as well as the IEEE 802.11n standard achieve their high data transmission rates using Orthogonal Frequency Division Multiplexing (OFDM) encoded symbols. Generally speaking, the use of OFDM divides the overall system bandwidth into a number of frequency sub-bands or channels, with each frequency sub-band being associated with a respective sub-carrier. Data upon each sub-carrier may be modulated with a modulation scheme such as QAM, phase shift keying, etc. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16 IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16 IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols. The recovered and recognized stream of symbols is then decoded, which may include deinterleaving and error correction using any of a number of known error correction techniques, to produce a set of recovered signals corresponding to the original signals transmitted by the transmitter.

For ease of explanation, in the examples presented herein, streams and symbols have a one-to-one correspondence. That is, a single stream is associated with a single symbol and vice versa. Accordingly, the words "streams" and "symbols" may be used interchangeably. However, it should be understood that a given stream, for example, may have a number of associated symbols and vice versa.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. Various other standards and projects, such as the 802.16 standard, or WiMAX, and the Long Term Evolution (LTE) project, support MIMO techniques. Generally speaking, the use of MIMO technology produces significant increases in spectral efficiency and link reliability of IEEE 802.11, IEEE 802.16, and other systems, and these benefits generally increase as the number of transmit and receive antennas within the MIMO system increases.

In addition to the frequency sub-channels created by the use of OFDM, a MIMO channel formed by the various transmit and receive antennas between a particular transmitter and a particular receiver may include a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth.

Generally, a wireless communication system in which a transmitting device transmits a signal to a receiving device may be represented by a model such as:

$$y = hx + z, \quad (1)$$

where y represents the symbol, or symbols, received by the receiving device, h represents the communication channel (also referred to as "channel gain"), x represents the symbol, or symbols transmitted by the transmitting device and z represents noise (e.g., additive Gaussian noise with power $\sigma_z^2$). Therefore, when a receiving device receives a symbol y, the receiving device may estimate the symbol x transmitted by the transmitting device.

The receiving device may estimate the transmitted symbol x using various techniques including "hard-decision" techniques and "soft-decision" techniques. Hard techniques typically involve simply making a determination regarding values of bits in the transmitted symbol x (e.g., whether a given transmitted bit is 0 or 1). Soft-decision techniques typically involve calculating likelihood values for the transmitted bits, where a likelihood value for a given bit indicates whether that bit is more likely to be 0 or 1. For example, the likelihood value L(i) for a given bit i in the transmitted symbol x may be represented by a log-likelihood ratio (LLR) as follows:

$$L(i) = \log \frac{P(i=1)}{P(i=0)} \quad (2)$$

where P(i=1) is the probability that the bit i is equal to 1 and P(i=0) is the probability that the bit i is equal to 0. Accordingly, if L(i) is a relatively large positive number, the probability that the bit i is equal to 1 is much greater than the probability that the bit i is equal to 0, and it may be determined that the bit i is equal to 1. Likewise, if L(i) is a relatively large negative number, the probability that the bit i is equal to 0 is much greater than the probability that the bit i is equal to 1, and it may be determined that bit i is equal to 0. If L(i) is neither a large positive number nor a large negative number, additional processing may be necessary to estimate the value of the bit i.

As known in the art, the LLR calculation for the bit i expressed in equation (2) may be written as follows:

$$L(i) = \log \frac{\sum_{x \in S_{1,i}} e^{\frac{-|y-hx|^2}{\sigma_z^2}}}{\sum_{x \in S_{0,i}} e^{\frac{-|y-hx|^2}{\sigma_z^2}}} = \log \sum_{x \in S_{1,i}} e^{\frac{-|y-hx|^2}{\sigma_z^2}} - \sum_{x \in S_{0,i}} e^{\frac{-|y-hx|^2}{\sigma_z^2}} \quad (3)$$

where $S_{1,i}$ is a set of all possible data symbols x with the bit i equal to 1 and $S_{0,i}$ is a set of all possible data symbols x with the bit i equal to 0. As is also known in the art, equation (3) may be approximated using log-max approximation as follows:

$$L(i) \approx \min_{x \in S_{0,i}} |y - hx|^2 - \min_{x \in S_{1,i}} |y - hx|^2 \quad (4)$$

As indicated by equation (4), the LLR calculation for a given bit i in the transmitted symbol x depends, in part, on the estimated communication channel h. Various techniques may be used to estimate the communication channel h. However, these techniques will typically estimate the communication channel h with some degree of error. As a result, LLR based on h may lead to errors in estimating x.

SUMMARY

In an embodiment, a method is implemented in a communication device configured to receive signals via a communication channel. The method includes determining, at the communication device, a mean square error $\sigma_h^2$ of an estimate h of the communication channel, and receiving, at the communication device, a data symbol y. The received data symbol y corresponds to a data symbol x transmitted over the communication channel. The method also includes determining, at the communication device, a likelihood value for a bit in the transmitted data symbol x. Determining the likelihood value for the bit in the transmitted data symbol x includes calculating a quantity according to $$e^{\frac{-|y-hx|^2}{\sigma_z^2 + \sigma_h^2 |x|^2}},$$

where $\sigma_z^2$ is a noise power associated with the communication channel. The method also includes calculating the likelihood value for the bit in the transmitted data symbol x as a function of the calculated quantity.

In another embodiment, a communication device configured to receive signals via a communication channel includes a demodulator configured to determine a mean square error $\sigma_h^2$ of an estimate h of the communication channel and receive a data symbol y. The received data symbol y corresponds to a data symbol x transmitted over the communication channel. The demodulator is also configured to determine a likelihood value for a bit in the transmitted data symbol x, at least by (i) calculating a quantity according to $$e^{\frac{-|y-hx|^2}{\sigma_z^2 + \sigma_h^2 |x|^2}},$$

where $\sigma_z^2$ is a noise power associated with the communication channel, and (ii) calculating the likelihood value for the bit in the transmitted data symbol x as a function of the calculated quantity. The communication device also includes a decoder configured to decode the received data symbol y based at least in part on the calculated likelihood value.

In another embodiment, a tangible, non-transitory computer readable memory stores instructions that, when executed on a processor, cause the processor to determine a mean square error $\sigma_h^2$ of an estimate h of a communication channel via which signals are received by a communication device, and receive a data symbol y. The received data symbol y corresponds to a data symbol x transmitted over the communication channel. The instructions also, when executed on the processor, cause the processor to determine a likelihood value for a bit in the transmitted data symbol x. The instructions cause the processor to determine the likelihood value for the bit in the transmitted data symbol x at least by (i) calculating a quantity according to $$e^{\frac{-|y-hx|^2}{\sigma_z^2+\sigma_h^2|x|^2}},$$

where $\sigma_z^2$ is a noise power associated with the communication channel, and (ii) calculating the likelihood value for the bit in the transmitted data symbol x as a function of the calculated quantity.

When individual elements are designated by references numbers in the form Xn, these elements may be referred to in the collective by X.

DETAILED DESCRIPTION

Figure 1:
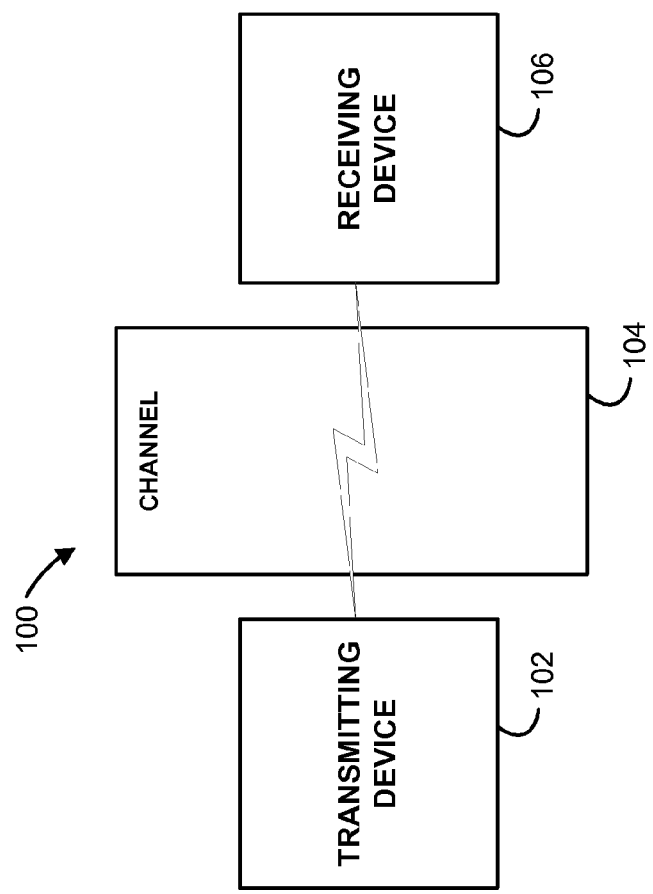
FIG. 1 is a block diagram of an example single-stream wireless communication system that may utilize demodulation techniques described herein.

FIG. 1 is a block diagram of an example wireless communication system 100 in which multiple devices, e.g., a transmitting device 102 and a receiving device 106, may communicate with each other via a shared wireless communication channel 104. Each of the devices 102 and 106 may be, for example, a stationary device, such as a base station or a mobile station. Although the wireless communication system 100 illustrated in FIG. 1 includes two devices, the wireless communication system 100 may, of course, include any number of devices.

Furthermore, although the wireless communication system 100 illustrated in FIG. 1 includes a transmitting device 102 and a receiving device 106, devices in the wireless communication system 100 may generally operate in multiple modes (e.g., a transmit mode and a receive mode). For example, if a given device is a mobile station in a WiMAX communication network or a lap top computer having an IEEE Standard 802.11n compliant wireless transceiver, the device may operate in both a transmit mode and a receive mode.

The transmitting device 102 and the receiving device 106 may communicate using a single frequency or multiple frequencies. When the transmitting device 102 and the receiving device 106 communicate using a multiple frequencies, the communication channel 104 may include multiple carriers or subcarriers, each associated with a particular frequency at which the devices 102 and 106 may communicate. In some embodiments, the wireless communication system 100 may use an OFDM technique, and the subcarriers may be selected to be mutually orthogonal (i.e., to minimize cross-talk between each pair of subcarriers). However, the wireless communication system 100 could also use any other frequency division multiplexing technique.

The receiving device 106 may be configured to perform demodulation techniques that account for channel estimation error, which will be described in more detail below. Before describing the demodulation techniques in detail, it is helpful to briefly explain how signals may be modulated.

Figure 2:
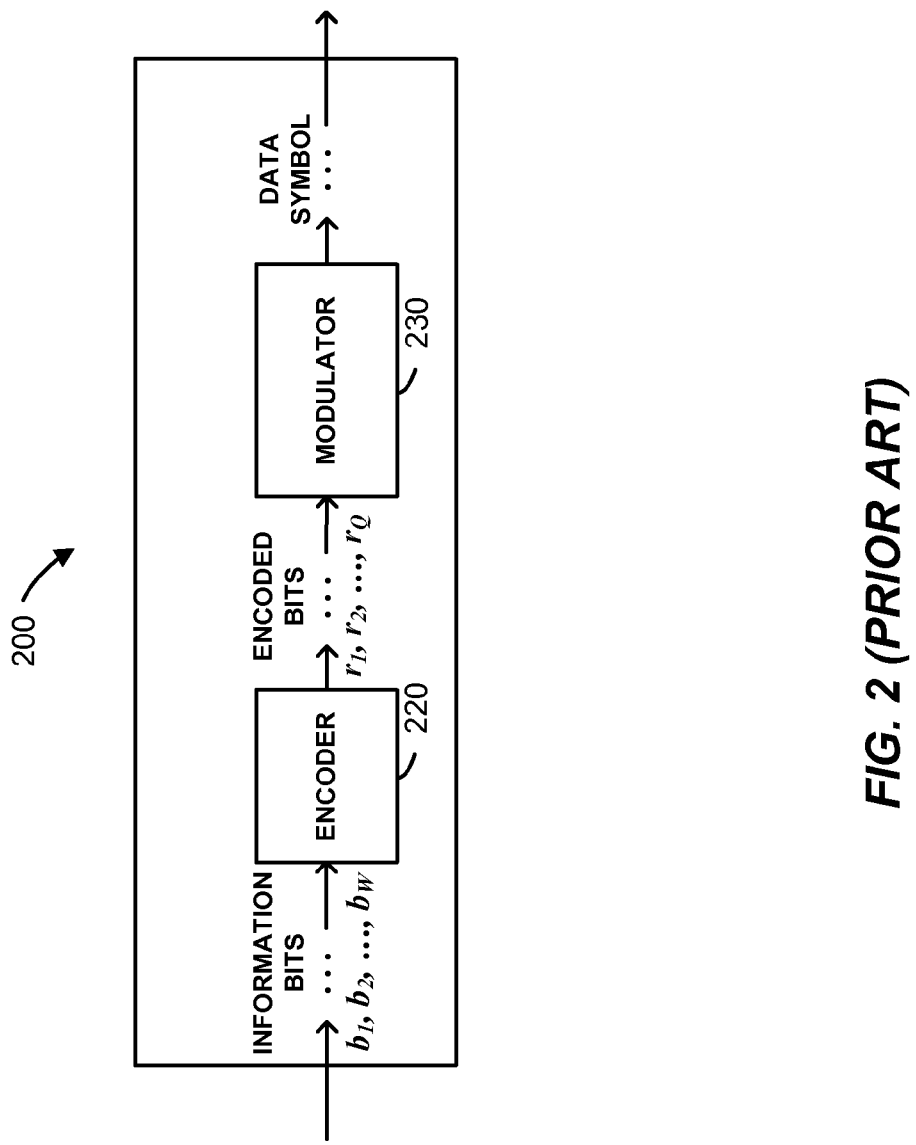
FIG. 2 is a block diagram of an example transmitting device that may be used in the single-stream wireless communication system of FIG. 1.

FIG. 2 is a block diagram of an example transmitting device 200. The transmitting device 200 may be utilized in the wireless communication system 100 as the transmitting device 102, for example. It will be understood, however, that the wireless communication system 100 may alternatively use another transmitting device 102.

Referring to FIG. 2, the transmitting device 200 may generally convert a sequence of W information bits $b_1, b_2, \ldots, b_W$ into signals appropriate for transmission through a wireless channel (e.g., channel 104). More specifically, the transmitting device 200 may include an encoder 220 (e.g., a convolution encoder, a forward error correction (FEC) encoder, and so on) that encodes W information bits $b_1, b_2, \ldots, b_W$ into Q encoded bits $r_1, r_2, \ldots, r_Q$, and a modulator 230 that modulates the Q encoded bits $r_1, r_2, \ldots, r_Q$ into data symbols, which are mapped and converted to signals appropriate for transmission, e.g., via one or more transmit antennas.

The transmitting device 200 may include various additional modules that, for ease of explanation, are not shown in FIG. 2. For example, the transmitting device 200 may include an interleaver that interleaves the encoded bits to mitigate burst errors. The transmitting device 200 may further include an analog radio frequency (RF) front end for performing frequency upconversion, various filters, power amplifiers, and so on.

Figure 3:
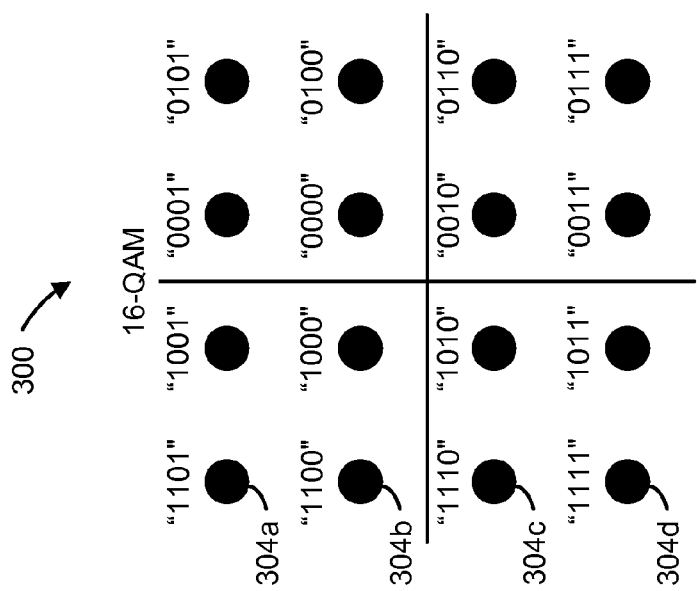
FIG. 3 is an example constellation set for a 16-QAM scheme.

In some embodiments, the modulator 230 may use QAM to map bits to symbols in a QAM signal constellation set, where the symbols are differentiated from one another by phase and magnitude. For example, FIG. 3 illustrates a 16-QAM constellation set 300 in an in phase and quadrature phase plane. Each constellation point 304 represents a different four-bit symbol: 304a may represent "1101," 304b may represent "1100," 304c may represent "1110," 304d may represent "1111," and so on. However, other bit to symbol mappings may be utilized.

In general, an n-bit symbol x may be mapped according to an M-QAM signal set, where $M=2^n$. Thus, as illustrated in FIG. 3, if the modulator 230 uses the 16-QAM modulation scheme the modulator 230 will have a signal alphabet size of $M=2^4=16$ (i.e., 16 constellation points), and will map 4-bit pairs into the 16 constellation points. If the modulator 230 uses a 64-QAM scheme, the modulator 230 will have an alphabet size of $M=2^6=64$ (i.e., 64 constellation points) and will map 6-bit segments into the 64 constellation points.

Figure 4:
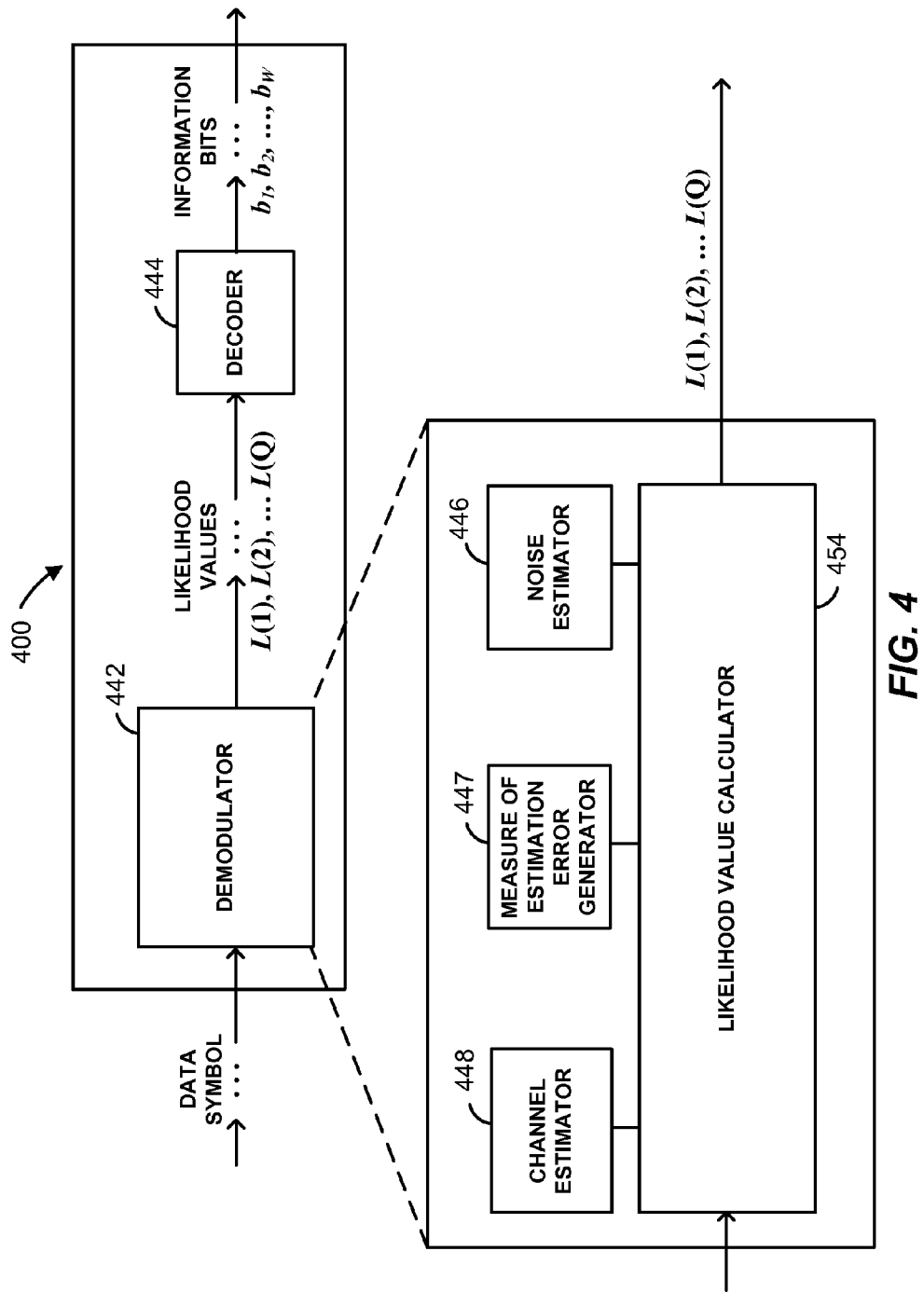
FIG. 4 is a block diagram of an example receiving device that may utilize demodulation techniques described herein.

FIG. 4 is a block diagram of an example receiving device 400 that demodulates received symbols using a technique that accounts for channel estimation error. The receiving device 400 may be utilized in the wireless communication system 100 as the receiving device 106, for example. It will be understood, however, that the wireless communication system 100 may alternatively use another receiving device 106. Similarly, the receiving device 400 may receive and demodulate multiple streams transmitted by a device such as the transmitting device 200 of FIG. 2 or some other transmitting device.

Generally speaking, the receiving device 400 may receive information and demodulate and decode the received information to estimate the information that was sent by a transmitting device. The receiving device 400 processes received information utilizing a model, such as:

$$y=(h+\Delta h)x+z, \quad (9)$$

where y represents the symbol, or symbols, received by receiving device, x represents the symbol, or symbols, transmitted by the transmitting device, z represents noise (e.g., additive Gaussian noise with power $\sigma_z^2$), h represents the estimated communication channel, and $\Delta h$ represents the channel estimation error. The channel estimation error $\Delta h$ may have a Gaussian distribution with mean square error $\sigma_h^2$ given by $$\sigma_h^2 = E\{|\Delta h|^2\} \quad (10)$$

The receiving device 400 includes a demodulator 442 that may provide, based on the received data symbols y, likelihood values L(1), L(2), . . . , L(Q) for the transmitted bits $r_1$, $r_2, \ldots, r_Q$. The receiving device 400 also includes a decoder 444 that may use the likelihood values L(1), L(2), . . . , L(Q) provided by the demodulator 442 to estimate the transmitted bits $r_1, r_2, \ldots, r_Q$, and, in turn, the original information bits $b_1$, $b_2, \ldots, b_W$.

In order to provide likelihood values L(1), L(2), . . . , L(Q) for the transmitted bits $r_1, r_2, \ldots, r_Q$, the demodulator 442 may include a likelihood value calculator 454 that calculates the likelihood values L(1), L(2), . . . , L(Q) based at least in part on the received symbol y and on the estimated communication channel h. To estimate the communication channel h, the demodulator 442 may include a channel estimator 448. Additionally, unlike conventional demodulators, the demodulator 442 illustrated in FIG. 4 may include a measure of channel estimation error generator 447 that generates a measure of the channel estimation error $\Delta h$ so that the demodulator 442 may account for that error when calculating the likelihood values L(1), L(2), . . . , L(Q). Because channel estimation error $\Delta h$ may depend on the noise z on the channel, the demodulator 442 may further include a noise estimator 446 for generating noise estimate information, including, for example, the variance of the noise $\sigma_z^2$.

The demodulator 442, in some embodiments, or in some modes of operation, may not include one or more of the modules 446-454 or, alternatively, may not use each of the modules 446-454 in demodulating the received signals. Further, it will be appreciated that some of the modules 446-454 may be combined. Still further, the demodulator 442 and/or the receiving device 400 may include additional components and/or modules that, for ease of explanation, are not shown in FIG. 4. For example, the receiving device 400 may include a deinterleaver that rearranges scattered bits and restores the proper bit sequence, an analog RF front end that performs frequency downconversion, various filters, power amplifiers, and so on.

Different components and/or modules of the receiving device 400 may be implemented as hardware, a processor executing software instructions, a processor implementing firmware instructions, or some combination thereof. For example, some or all of the components may be custom integrated circuits, application-specific integration circuits (ASICs), etc., communicatively coupled by electrical busses. In this case, the receiving device 400 optionally may include bypass busses (not shown) to bypass some of the components if the currently active mode does not require certain operations, such as processing multiple presentations of a symbol encoded according to a space-time encoding scheme.

Figure 5:
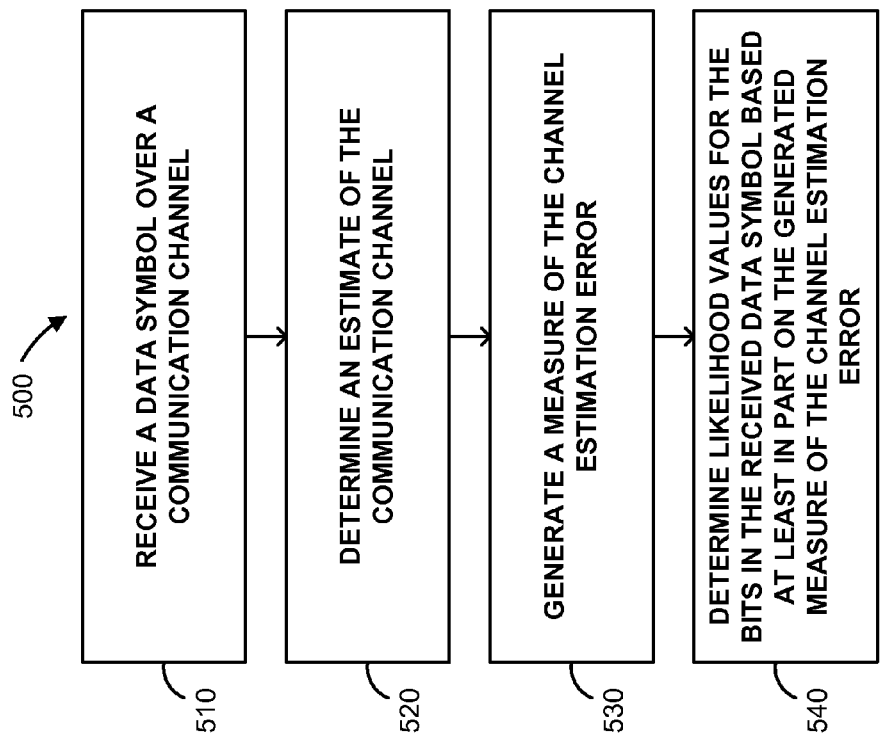
FIG. 5 is a flow diagram of an example demodulation technique that accounts for channel estimation error that may be used in a single-stream wireless communication system.

FIG. 5 is a flow diagram of an example demodulation method 500 that the receiving device 400, or a similar receiving device, may use to calculate the likelihood values L(1), L(2), . . . , L(Q) of the transmitted bits $r_1, r_2, \ldots, r_Q$, accounting for channel estimation error $\Delta h$. For ease of explanation, FIG. 5 will be described with reference to FIGS. 1-4. It will be understood, however, that the method 500 for calculating LLRs may be utilized with systems, devices, and modulation schemes other than those illustrated in FIGS. 1-4.

The receiving device 400 may receive, over a communication channel h, a data symbol y corresponding to a transmitted data symbol x, e.g., transmitted by a transmitting device (block 510). In order to demodulate and decode the received symbol, the receiving device 400 may first determine an estimate of the communication channel h (block 520), e.g., using the channel estimator 448. This estimation of the communication channel h may be performed in a variety of ways, including using channel estimation techniques known in the art (e.g., least squares channel estimation, iterative channel estimation, and so on).

The receiving device 400 may then generate a measure of the channel estimation error $\Delta h$ (block 530), e.g., using measure of estimation error generator 447. In one implementation, it may be assumed that the channel estimation error $\Delta h$ has a Gaussian distribution with a mean square error $\sigma_h^2$, given by $\sigma_h^2=E\{|\Delta h|^2\}$. Additionally, $\sigma_h^2$ may be estimated as the noise power, $\sigma_z^2$. In this implementation, the measure of the channel estimation error $\Delta h$ may be set to the noise power. One of ordinary skill in the art, however, will understand that the measure of the channel estimation error $\Delta h$ may be generated differently in other implementations. For example, the measure of the channel estimation error $\Delta h$ may be set to a scaled value of the noise power, and the scaling may depend on such facts as the channel estimation technique, the number of training symbols transmitted for the purpose of channel estimation, etc.

Once the receiving device 400 generates the measure of the channel estimation error $\Delta h$ (block 530), the receiving device 400 may determine likelihood values for the bits in the transmitted symbol x using the generated measure (block 540), e.g., using the likelihood value calculator 454.

For example, in one implementation in which the measure is set to the noise power, the demodulator 442 may calculate a log-likelihood ratio (LLR) for some, or all, of the Q transmitted bits $r_1, r_2, \ldots, r_Q$. The LLR of a given bit i may be an indication of whether the bit i is more likely to be 0 or 1. LLR for a given bit i may be calculated as follows:

$$L(i) = \log \frac{\sum_{x \in S_{1,i}} \frac{1}{(\sigma_z^2 + \sigma_h^2 |x|^2)\pi} e^{\frac{-|y-hx|^2}{\sigma_z^2 + \sigma_h^2 |x|^2}}}{\sum_{x \in S_{0,i}} \frac{1}{(\sigma_z^2 + \sigma_h^2 |x|^2)\pi} e^{\frac{-|y-hx|^2}{\sigma_z^2 + \sigma_h^2 |x|^2}}} \quad (11)$$

where $S_{1,i}$ is a set of all possible data symbols x with bit i equal to 1 and $S_{0,i}$ is a set of all possible data symbols x with bit i equal to 0. As explained above, if L(i) is a relatively large positive number, the probability that the bit i is equal to 1 is much greater than the probability that the bit i is equal to 0, so the decoder 444 may determine that the bit i is equal to 1. Likewise, if L(i) is a relatively large negative number, the probability that the bit i is equal to 0 is much greater than the probability that the bit i is equal to 1, and the decoder 444 may determine that the bit i is equal to 0. If L(i) is neither a large positive number nor a large negative number, the decoder 444 may need to perform additional processing to estimate the value of bit i.

Using log-max approximation, equation (11) may be approximated as follows:

$$L(i) = \max_{x \in S_{1,i}} \log \frac{e^{\frac{-|y-hx|^2}{\sigma_z^2 + \sigma_h^2 |x|^2}}}{(\sigma_z^2 + \sigma_h^2 |x|^2)\pi} - \max_{x \in S_{0,i}} \log \frac{e^{\frac{-|y-hx|^2}{\sigma_z^2 + \sigma_h^2 |x|^2}}}{(\sigma_z^2 + \sigma_h^2 |x|^2)\pi} \quad (12)$$

Therefore, as compared to the LLR calculations in equation (3)-(4), the LLR calculation for the bit i in accordance with equations (11)-(12) is a function of the mean square error $\sigma_h^2$ of the channel estimation error Δh (e.g., the noise power $\sigma_z^2$). This compensation for the channel estimation error Δh may lead to better accuracy in the aggregate associated with LLR calculation and, more generally, to a more optimal performance in the aggregate.

Demodulation techniques that account for channel estimation error have been described in reference to a single-stream communication system, such as the communication system 100 illustrated in FIG. 1. However, it will be understood that the techniques described herein may be utilized with multi-stream communication systems.

Figure 6:
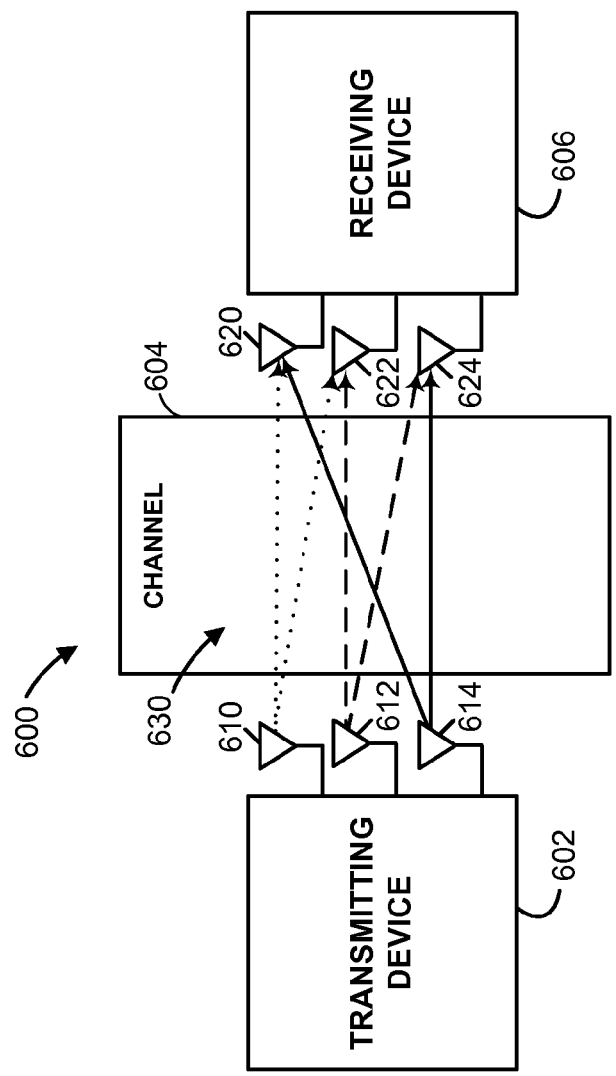
FIG. 6 is a block diagram of an example multi-stream wireless communication system that may utilize demodulation techniques described herein.

For example, FIG. 6 is a block diagram of an example multi-stream wireless communication system 600 in which multiple devices, e.g., a transmitting device 602 and a receiving device 606 may communicate with each other via a shared wireless communication channel 604. Each of the devices 602 and 606 may be, for example, a stationary device, such as a base station or a mobile station equipped with a set of antennas 610-614 and 620-624, respectively. Although the multi-stream wireless communication system 600 illustrated in FIG. 6 includes two devices, the multi-stream wireless communication system 100 may, of course, include any number of devices, each equipped with the same or a different number of antennas (e.g., 1, 2, 3, 4 antennas and so on).

Furthermore, although the wireless communication system 600 illustrated in FIG. 6 includes a transmitting device 602 and a receiving device 606, devices in the wireless communication system 600 may generally operate in multiple modes (e.g., a transmit mode and a receive mode). For example, if a given device is a mobile station in a WiMAX communication network or a lap top computer having an IEEE Standard 802.11n compliant wireless transceiver, the device may operate in both a transmit mode and a receive mode. Accordingly, in some embodiments, antennas 610-614 and 620-624 may support both transmission and reception. Alternatively, or additionally, a given device may include separate transmit antennas and separate receive antennas.

Different numbers of spatial streams 630 may be transmitted between the antennas 610-614 and 620-624 in various embodiments and/or configurations of the transmitting device 602 and/or the receiving device 606. Typically, the number S of spatial streams 630 associated with a shared communication channel 606 is less than or equal to minimum of the number $N_T$ of transmit antennas 610-614 and the number $N_R$ of receive antennas 620-624 (i.e., $N_S \leq \min(N_T, N_R)$). The streams 630 may be defined in a variety of ways, e.g., according to various multiple-input and multiple-output (MIMO) modes or schemes, including those known in the art. For example, the transmitting device 602 may use the antennas 610-614 to improve channel diversity by transmitting multiple copies of the same symbol via several streams. Alternatively, the transmitting device 602 may transmit different symbols via each of the antennas 610-614 to increase throughput. As yet another alternative, the transmitting device 602 may operate in a mixed MIMO mode to improve both channel diversity and throughput.

The transmitting device 602 and the receiving device 606 may communicate using a single frequency or multiple frequencies. When the transmitting device 602 and the receiving device 606 communicate using multiple frequencies, the communication channel 604 may include multiple carriers or subcarriers, each associated with a particular frequency at which the devices 602 and 606 may communicate. In some embodiments, the multi-stream wireless communication system 600 may use an OFDM technique, and the subcarriers may be selected to be mutually orthogonal (i.e., to minimize cross-talk between each pair of subcarriers). However, the multi-stream wireless communication system 600 could also use any other frequency division multiplexing technique.

The receiving device 606 may be configured to perform demodulation techniques that account for channel estimation error to be described in more detail below. Before describing these demodulation techniques in detail, it is helpful to briefly explain how signals may be modulated in a multi-stream communication system.

Figure 7A:
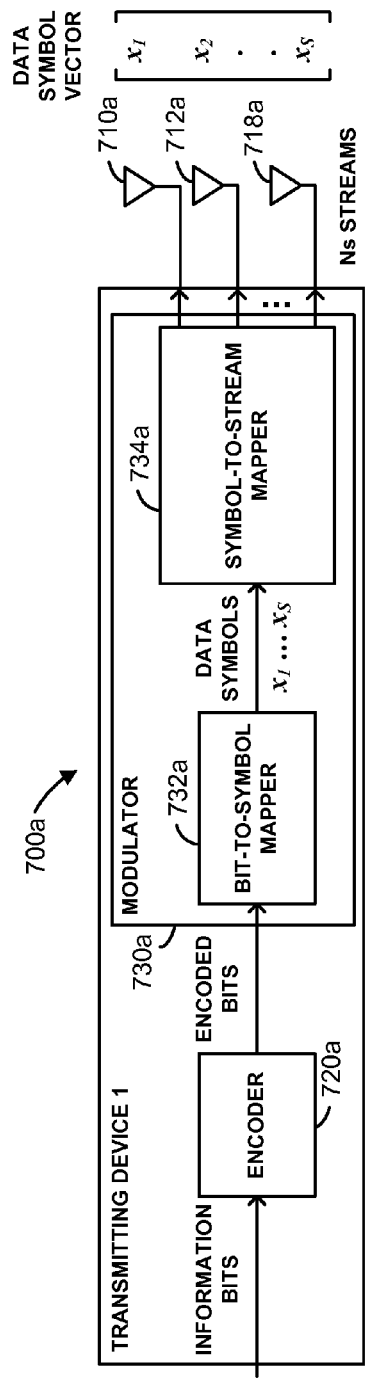
FIG. 7A is a block diagram of an example transmitting device that may be utilized in the multi-stream wireless communication system of FIG. 6.
Figure 7B:
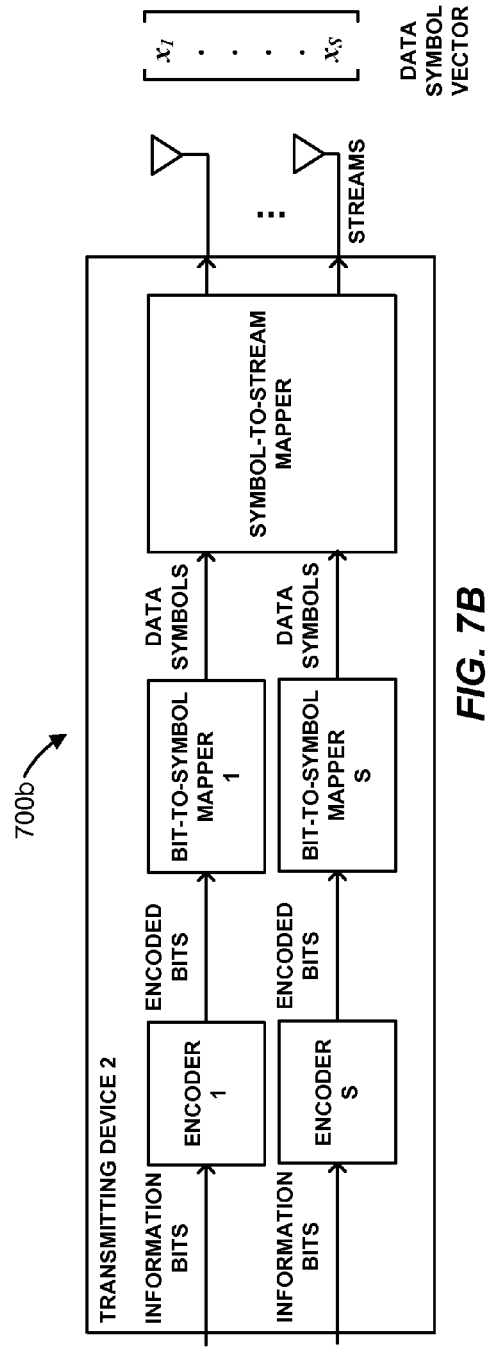
FIG. 7B is a block diagram of another example transmitting device that may be utilized in the multi-stream wireless communication system of FIG. 6.

FIGS. 7A-7B are block diagrams of example transmitting devices 700. The transmitting devices 700 may be utilized in the multi-stream wireless communication system 600 as the transmitting device 602, for example. It will be understood, however, that the multi-stream wireless communication system 600 may alternatively use another transmitting device 102.

Referring to FIG. 7A, the transmitting device 700a may generally convert a sequence of information bits into signals appropriate for transmission through a wireless channel (e.g., channel 604). More specifically, the transmitting device 700a may include an encoder 720a (e.g., a convolution encoder, a forward error correction (FEC) encoder, and so on) that encodes information bits, and a modulator 730a that modulates the encoded bits into data symbols, which are mapped and converted to signals appropriate for transmission via transmit antennas 710a-718a. The transmitting device 700a may include various additional modules that, for ease of explanation, are not shown in FIG. 7A. For example, the transmitting device 700a may include an interleaver that interleaves the encoded bits to mitigate burst errors. The transmitting device 700a may further include an analog radio frequency (RF) front end for performing frequency upconversion, various filters, power amplifiers, and so on.

The modulator 730a may include a bit-to-symbol mapper 732a that maps encoded bits into multiple data symbols, and a symbol-to-stream mapper 734a that maps the multiple data symbols into multiple parallel spatial streams. For example, the modulator 730a may generate S parallel spatial streams that may be represented by a data symbol vector $x=[x_1, x_2, \ldots, x_S]$, and each individual symbol x, in the data symbol vector x may be a symbol representative of Q transmitted bits $(r_{s,1}, r_{s,2}, \ldots, r_{s,Q})$. Accordingly, a given bit $r_{s,n}$ is the n-th bit in a data symbol of the s-th spatial stream.

For ease of explanation, in the examples presented herein, streams and symbols have a one-to-one correspondence. That is, a single stream is associated with a single symbol and vice versa. Accordingly, the words "streams" and "symbols" may be used interchangeably. However, it should be understood that a given stream, for example, may have a number of associated symbols and vice versa. It should be further understood that, in some embodiments, the same symbol may be transmitted on multiple streams.

In some embodiments, the modulator 730a may use QAM to map bits to symbols in a QAM signal constellation set, where the symbols are differentiated from one another by phase and/or magnitude, as discussed, for example, in reference to FIG. 3. However, other bit-to-symbol mappings may be utilized.

It should be noted that although the transmitting device 700a described with reference to FIG. 7A includes a common encoder chain (an encoder 720a, an interleaver (not shown), a modulator 730a, etc.), a transmitting device 700 may include different encoder chains for different streams. For example, as illustrated in FIG. 7B, each stream generated by the transmitting device 700b may correspond to a separate encoder chain. Other transmitting devices, such as those supporting the WiMAX standards, for example, may support both a single-encoder option and a two-encoder option for a two-transmit-antenna configuration. In general, the number of encoders and/or encoder chains may be less than or equal to the number of transmitted streams S.

Figure 8:
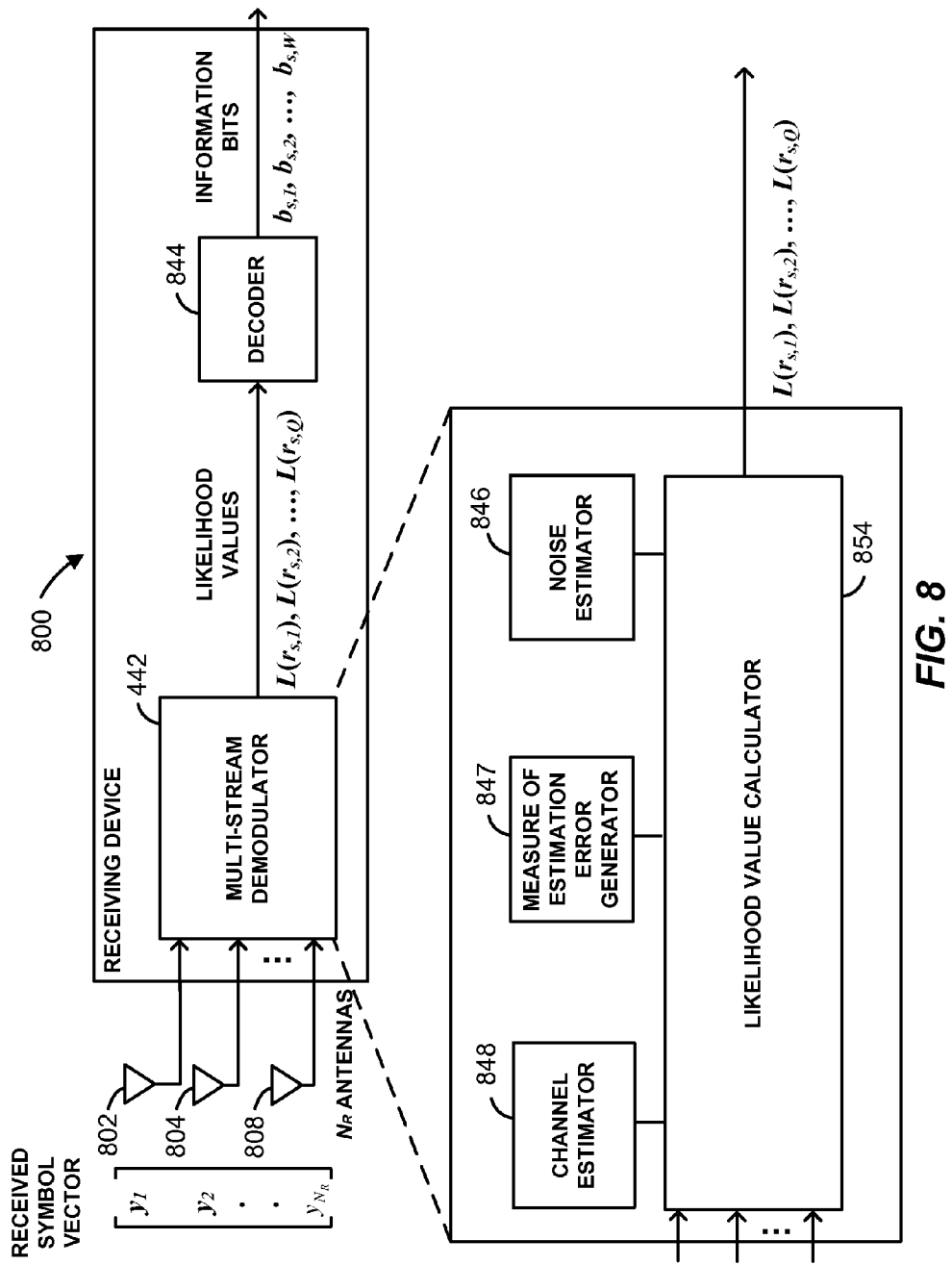
FIG. 8 is a block diagram of an example receiving device that may utilize demodulation techniques described herein.

FIG. 8 is a block diagram of an example receiving device 800 that demodulates received symbol data symbol vectors, accounting for channel estimation error. The receiving device 800 may be utilized in the multi-stream wireless communication system 600 as the receiving device 606, for example. It will be understood, however, that the multi-stream wireless communication system 600 may alternatively use another receiving device 606. Similarly, the receiving device 800 may receive and demodulate multiple streams transmitted by a device such as the transmitting device 700a of FIG. 7A or the transmitting device 700b of FIG. 7B or some other transmitting device.

Generally, the receiving device 800 may receive information via multiple receive antennas 802-808 and demodulate and decode the received information to estimate the information that was sent by a transmitting device. The receiving device 800 processes received information utilizing a model, such as:

$$y=(H+\Delta H)x+z, \quad (13)$$

where $$y = \begin{bmatrix} y_1 \\ y_2 \\ \vdots \\ y_{N_R} \end{bmatrix}; x = \begin{bmatrix} x_1 \\ x_2 \\ \vdots \\ x_{N_S} \end{bmatrix}; z = \begin{bmatrix} z_1 \\ z_2 \\ \vdots \\ z_{N_R} \end{bmatrix},$$

$$H = \begin{bmatrix} h_{1,1} & h_{1,2} & \ldots & h_{1,S} \\ h_{2,1} & h_{2,2} & \ldots & h_{2,S} \\ \vdots & \vdots & \vdots & \vdots \\ h_{N_R,1} & h_{N_R,2} & \ldots & h_{N_R,S} \end{bmatrix};$$

$$\Delta H = \begin{bmatrix} \Delta h_{1,1} & \Delta h_{1,2} & \ldots & \Delta h_{1,S} \\ \Delta h_{2,1} & \Delta h_{2,2} & \ldots & \Delta h_{2,S} \\ \vdots & \vdots & \vdots & \vdots \\ \Delta h_{N_R,1} & \Delta h_{N_R,2} & \ldots & \Delta h_{N_R,S} \end{bmatrix};$$

in which y represents, in vector from, a received signal, H represents a MIMO communication channel, x represents, in vector form, an estimated transmit signal, z represents a noise vector, and $N_R$ is the number of receive antennas. More precisely, $y_j$ is a received signal at antenna j, and $z_j$ is noise at an antenna j. Although $N_R$ is illustrated in FIG. 8 as being three, any number of multiple antennas may, in general, be utilized.

The MIMO communication channel H includes channel gain parameters $h_{j,s}$ representing channel gain in a stream s at a receive antenna j. In at least some of the embodiments, each channel gain $h_{j,s}$ is a complex number that incorporates an amplitude factor and a phase shift factor. In other words, each $h_{j,s}$ parameter may represent an attenuation coefficient associated with a certain propagation path as used in, for example, a Rayleigh fading channel model. The receiving device 400 may estimate the parameters $h_{j,s}$, and parameters associated with the noise z using any suitable technique, including known techniques.

The estimated MIMO communication channel H may also have an error $\Delta H$ associated with it. That is, one, two, or more $h_{j,s}$ parameter may have $\Delta h_{j,s}$ errors associated with them.

With continued reference to FIG. 8, the receiving device 800 includes a multi-stream demodulator 842 that may provide likelihood values $L(r_{s,1})$, $L(r_{s,2})$, ..., $L(r_{s,Q})$ for the transmitted bits $r_{s,1}, r_{s,2}, \ldots, r_{s,Q}$. The receiving device 800 also includes a decoder 844 that may use the likelihood values $L(r_{s,1})$, $L(r_{s,2})$, ..., $L(r_{s,Q})$ provided by the multi-stream demodulator 842 to estimate the transmitted bits $r_{s,1}, r_{s,2}, \ldots, r_{s,Q}$, and in turn, the original information bits $b_{s,1}, b_{s,2}, \ldots, b_{s,W}$.

In order to provide likelihood values $L(b_{s,1})$, $L(b_{s,2})$, ..., $L(b_{s,Q})$ for the transmitted bits $r_{s,1}, r_{s,2}, \ldots, r_{s,Q}$, the multi-stream demodulator 842 may include a likelihood value calculator 854 that calculates the likelihood values $L(r_{s,1})$, $L(r_{s,2})$, ..., $L(r_{s,Q})$ based at least in part on the received signal y and on the estimated communication channel H. To estimate the communication channel H, the multi-stream demodulator 842 may include a channel estimator 848. Additionally, unlike conventional demodulators, the multi-stream demodulator 842 illustrated in FIG. 8 may include a measure of channel estimation error generator 847 that generates a measure of the channel estimation error $\Delta H$ so that the demodulator 842 may account for that error when calculating the likelihood values $L(r_{s,1}), L(r_{s,2}), \ldots, L(r_{s,Q})$. Because channel estimation error $\Delta H$ may depend on the noise z on the channel, the multi-stream demodulator 842 may further include a noise estimator 846 for generating noise estimate information, including, for example, the power $\sigma_z^2$ of the noise.

The multi-stream demodulator 842, in some embodiments, or in some modes of operation, may not include one or more of the modules 846-854 or, alternatively, may not use each of the modules 846-854 in demodulating the received signals. Further, it will be appreciated that some of the modules 846-

854 may be combined. Still further, the multi-stream demodulator 842 and/or the receiving device 800 may include additional components and/or modules that, for ease of explanation, are not shown in FIG. 8. For example, the receiving device 800 may include a deinterleaver that rearranges scattered bits and restores the proper bit sequence, an analog RF front end that performs frequency downconversion, various filters, power amplifiers, and so on.

Different components and/or modules of the receiving device 800 may be implemented as hardware, a processor executing software instructions, a processor implementing firmware instructions, or some combination thereof. For example, some or all of the components may be custom integrated circuits, application-specific integration circuits (ASICs), etc., communicatively coupled by electrical busses. In this case, the receiving device 800 optionally may include bypass busses (not shown) to bypass some of the components if the currently active MIMO mode does not require certain operations, such as processing multiple presentations of a symbol encoded according to a space-time encoding scheme.

Figure 9:
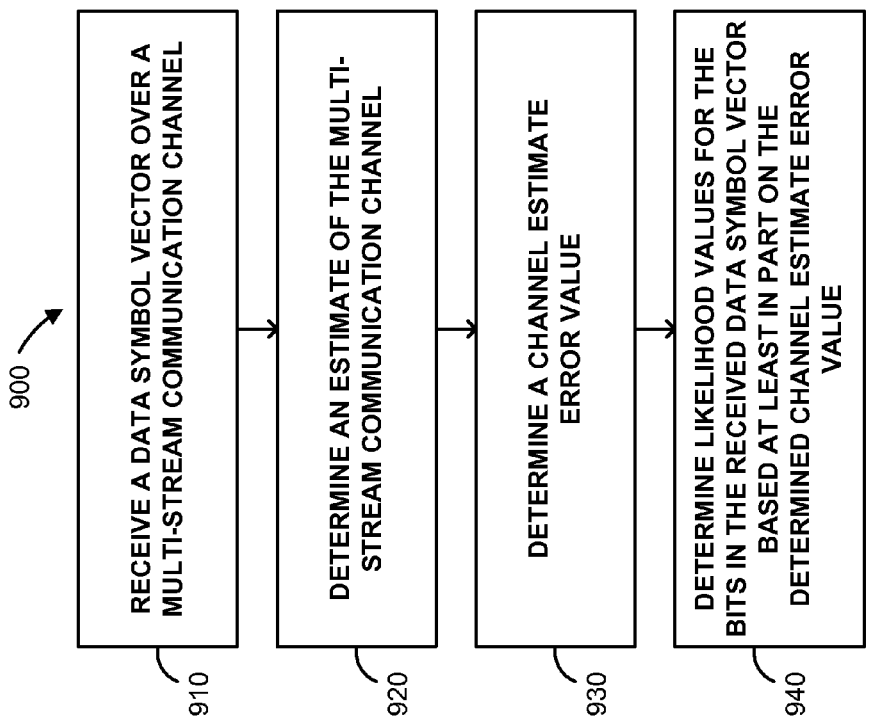
FIG. 9 is a flow diagram of an example demodulation technique that accounts for channel estimation error that may be used in a multi-stream wireless communication system.

FIG. 9 is a flow diagram of an example demodulation method 900 that the receiving device 800, or a similar receiving device, may use to calculate the likelihood values $L(r_{s,1})$, $L(r_{s,2})$, ..., $L(r_{s,Q})$ of the transmitted bits $r_{s,1}, r_{s,2}, \ldots, r_{s,Q}$, accounting for channel estimation error. For ease of explanation, FIG. 9 will be described with reference to FIGS. 6-8. It will be understood, however, that the method 900 for calculating LLRs may be utilized with systems and devices other than those illustrated in FIGS. 6-8.

Generally speaking when the receiving device 800 may receive, over a multi-stream communication channel H, a data symbol vector $y=[y_1, y_2, \ldots, y_{N_R}]$ (block 910). In other words, the receiving device 800 may receive multiple data symbols $y_s$ via multiple antennas 802-808 at substantially the same time.

In order to decode and/or demodulate the received data symbols, the receiving device 800 may determine an estimate of the multi-stream communication channel H (block 920), e.g., using the channel estimator 848. This estimation of the multi-stream communication channel H may be performed in a variety of ways, including using channel estimation techniques known in the art (e.g., least squares channel estimation, iterative channel estimation, and so on).

The receiving device 800 may then generate a measure of the channel estimation error $\Delta H$ (block 530), e.g., using measure of estimation error generator 847. In one implementation, this measure may be set to the noise power $\sigma_z^2$, or to a scaled version of the noise power $\sigma_z^2$. However, other values for the measure of the channel estimation error $\Delta H$ may be used.

Once the receiving device 800 generates the measure of the channel estimation error $\Delta H$ (block 530), the receiving device 800 may determine, e.g., using the likelihood value calculator 858, likelihood values for the bits in the transmitted symbol vector x, at least in part based on the generated measure (block 940). This may be done, for instance, by extending equations (11)-(12) into vector form using suitable linear algebra and other techniques.

Figure 10:
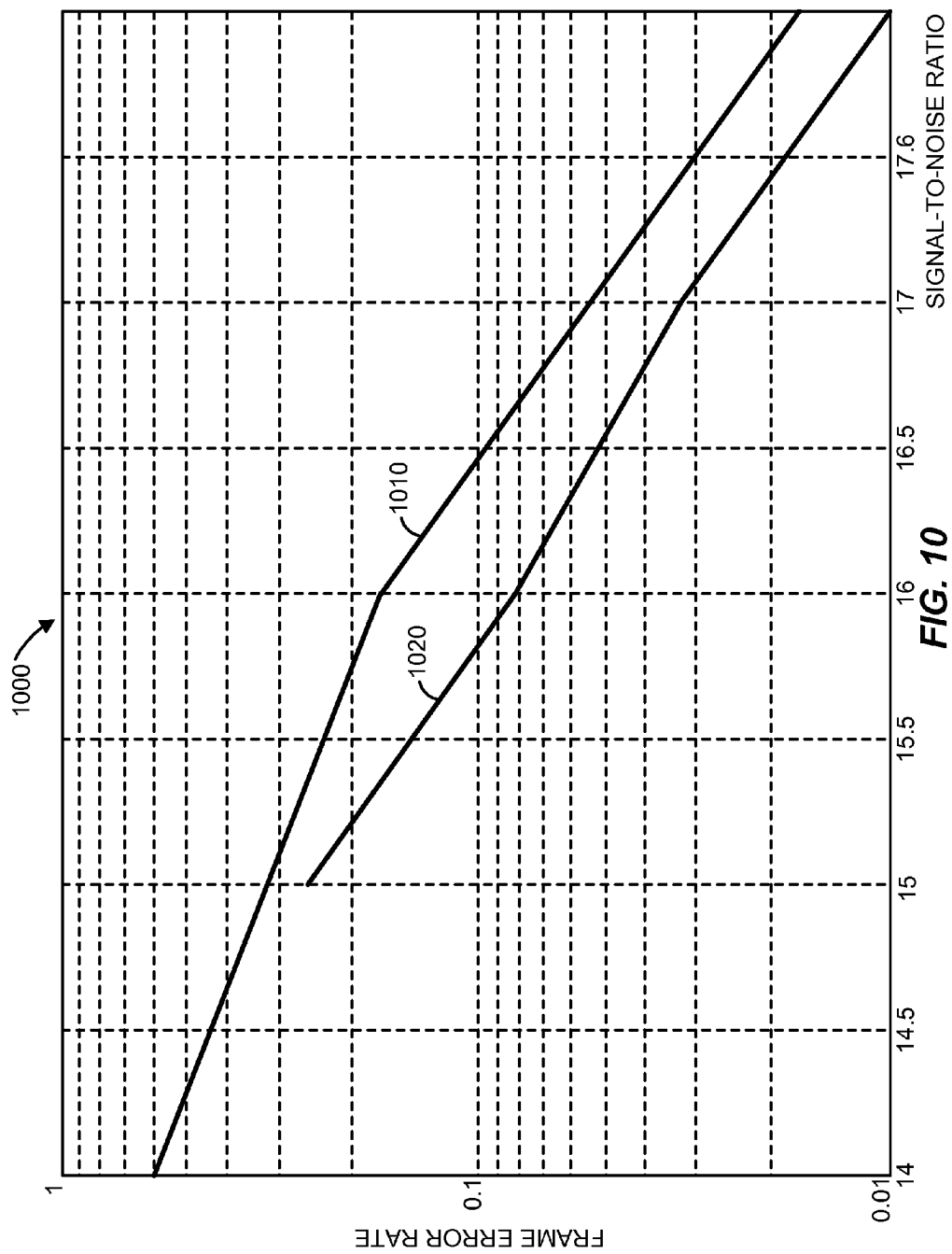
FIG. 10 is a graph illustrating the performance of a simulated receiving device utilizing conventional demodulating techniques and the performance of a simulated receiving device utilizing demodulation techniques described herein.

Accounting for channel estimation error $\Delta H$ may generally lead to better accuracy associated with LLR calculation (and, more broadly, with demodulation and/or decoding) and result in a more optimal performance in the aggregate. For example, FIG. 10 is a graph 1000 illustrating the performance of a simulated receiving device utilizing conventional demodulating techniques that do not account for channel estimation error (plot 1010) and the performance of a simulated receiving device utilizing demodulation techniques described herein that account for channel estimation error (plot 1020). For this simulation, a transmitting device with 1 antenna and a receiving device with 4 antennas were simulated, where the transmitting device was transmitting packets of 1000 bytes (modulated using 64-QAM modulation) to the receiving device. A type D, non-line of sight (DNLOS) channel model with no impairments was used, and it was assumed that $\sigma_h^2$ was equal to the power of the additive Gaussian noise $\sigma_z^2$.

As illustrated in the graph 1000 in FIG. 10, for the same frame error rate, the receiving device utilizing demodulation techniques described herein that account for channel estimation error could operate in environments with a higher signal-to-noise ratio than could the simulated receiving device utilizing conventional demodulating techniques that do not account for channel estimation error. For example, for a frame error rate of 0.08 (i.e., 8 out every 100 packets in error), the receiving device utilizing demodulation techniques described herein, accounting for channel estimation error, could operate in environments with a 0.50-0.75 dB higher signal-to-noise ratio than could the simulated receiving device utilizing conventional demodulating techniques, not accounting for channel estimation error. In general, demodulation techniques described herein that account for channel estimation error may lead to a gain performance of the order to 0.5 dB in the low to moderate signal-to-noise ratio regime.

At least some of the various blocks, operations, and techniques described above may be implemented using hardware, a processor executing firmware instructions, a processor executing software instructions, or any combination thereof. When implemented using a processor executing firmware or software instructions, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method implemented in a communication device configured to receive signals via a communication channel, the method comprising:

determining, at the communication device, a mean square error $\sigma_h^2$ of an estimate h of the communication channel;

receiving, at the communication device, a data symbol y, wherein the received data symbol y corresponds to a data symbol x transmitted over the communication channel; and determining, at the communication device, a likelihood value for a bit in the transmitted data symbol x, wherein determining the likelihood value for the bit in the transmitted data symbol x includes calculating a quantity according to $$e^{\frac{-|y-hx|^2}{\sigma_z^2+\sigma_h^2|x|^2}},$$

where $\sigma_z^2$ is a noise power associated with the communication channel, and calculating the likelihood value for the bit in the transmitted data symbol x as a function of the calculated quantity.

2. The method of claim 1, wherein calculating the likelihood value for the bit in the transmitted data symbol x includes calculating a log-likelihood ratio for the bit in the transmitted data symbol x.

3. The method of claim 1, wherein calculating the likelihood value for the bit in the transmitted data symbol x includes calculating the likelihood value according to $$L(i) = \log \frac{\sum_{x \in S_{1,i}} \frac{1}{(\sigma_z^2+\sigma_h^2|x|^2)\pi} e^{\frac{-|y-hx|^2}{\sigma_z^2+\sigma_h^2|x|^2}}}{\sum_{x \in S_{0,i}} \frac{1}{(\sigma_z^2+\sigma_h^2|x|^2)\pi} e^{\frac{-|y-hx|^2}{\sigma_z^2+\sigma_h^2|x|^2}}}$$

where $S_{1,i}$ is a set of all possible transmitted data symbols x with bit i equal to 1, and $S_{0,i}$ is a set of all possible transmitted data symbols x with bit i equal to 0.

4. The method of claim 1, wherein calculating the likelihood value for the bit in the transmitted data symbol x comprises calculating the likelihood value according to $$L(i) = \max_{x \in S_{1,i}} \log \frac{e^{\frac{-|y-hx|^2}{\sigma_z^2+\sigma_h^2|x|^2}}}{(\sigma_z^2+\sigma_h^2|x|^2)\pi} - \max_{x \in S_{0,i}} \log \frac{e^{\frac{-|y-hx|^2}{\sigma_z^2+\sigma_h^2|x|^2}}}{(\sigma_z^2+\sigma_h^2|x|^2)\pi}$$

$$x \in S_{1,i} \qquad x \in S_{0,i}$$

where $S_{1,i}$ is a set of all possible transmitted data symbols x with bit i equal to 1, and $S_{0,i}$ is a set of all possible transmitted data symbols x with bit i equal to 0.

5. The method of claim 1, further comprising determining the estimate h of the communication channel.

6. The method of claim 1, wherein the transmitted data symbol x is modulated using a modulation scheme that generates a plurality of constellation points, and wherein at least two constellation points in the plurality of constellation points have different amplitudes.

7. The method of claim 6, wherein the modulation scheme is a quadrature amplitude modulation (QAM) having at least 8 constellation points.

8. The method of claim 1, wherein:

the communication channel includes a plurality of channels corresponding to a plurality of spatial streams; and receiving a data symbol y includes receiving a data symbol vector that (i) corresponds to a transmitted data symbol vector that includes a plurality of transmitted data symbols, and (ii) includes a plurality of data symbols received in parallel via the plurality of spatial streams.

9. A communication device configured to receive signals via a communication channel, the communication device comprising:

a demodulator configured to determine a mean square error $\sigma_h^2$ of an estimate h of the communication channel;

receive a data symbol y, wherein the received data symbol y corresponds to a data symbol x transmitted over the communication channel, and determine a likelihood value for a bit in the transmitted data symbol x, at least by (i) calculating a quantity according to $$e^{\frac{-|y-hx|^2}{\sigma_z^2+\sigma_h^2|x|^2}},$$

where $\sigma_z^2$ is a noise power associated with the communication channel, and (ii) calculating the likelihood value for the bit in the transmitted data symbol x as a function of the calculated quantity; and a decoder configured to decode the received data symbol y based at least in part on the calculated likelihood value.

10. The communication device of claim 9, wherein the demodulator is configured to calculate the likelihood value for the bit in the transmitted data symbol x at least by calculating a log-likelihood ratio for the bit in the transmitted data symbol x.

11. The communication device of claim 9, wherein the demodulator is configured to calculate the likelihood value for the bit in the transmitted data symbol x at least by calculating the likelihood value according to $$L(i) = \log \frac{\sum_{x \in S_{1,i}} \frac{1}{(\sigma_z^2+\sigma_h^2|x|^2)\pi} e^{\frac{-|y-hx|^2}{\sigma_z^2+\sigma_h^2|x|^2}}}{\sum_{x \in S_{0,i}} \frac{1}{(\sigma_z^2+\sigma_h^2|x|^2)\pi} e^{\frac{-|y-hx|^2}{\sigma_z^2+\sigma_h^2|x|^2}}}$$

where $S_{1,i}$ is a set of all possible transmitted data symbols x with bit i equal to 1, and $S_{0,i}$ is a set of all possible transmitted data symbols x with bit i equal to 0.

12. The communication device of claim 9, wherein the demodulator is configured to calculate the likelihood value for the bit in the transmitted data symbol x at least by calculating the likelihood value according to $$L(i) = \max_{x \in S_{1,i}} \log \frac{e^{\frac{-|y-hx|^2}{\sigma_z^2 + \sigma_h^2 |x|^2}}}{(\sigma_z^2 + \sigma_h^2 |x|^2)\pi} \max_{x \in S_{0,i}} \log \frac{e^{\frac{-|y-hx|^2}{\sigma_z^2 + \sigma_h^2 |x|^2}}}{(\sigma_z^2 + \sigma_h^2 |x|^2)\pi}$$

$$x \in S_{1,i} \qquad x \in S_{0,i}$$

where $S_{1,i}$ is a set of all possible transmitted data symbols x with bit i equal to 1, and $S_{0,i}$ is a set of all possible transmitted data symbols x with bit i equal to 0.

13. The communication device of claim 9, wherein the transmitted data symbol x is modulated using a modulation scheme that generates a plurality of constellation points, and wherein at least two constellation points in the plurality of constellation points have different amplitudes.

14. The communication device of claim 9, wherein:
the communication channel includes a plurality of channels corresponding to a plurality of spatial streams;
the data symbol y includes a data symbol vector that (i) corresponds to a transmitted data symbol vector that includes a plurality of transmitted data symbols, and (ii) includes a plurality of data symbols received in parallel via the plurality of spatial streams.

15. A tangible, non-transitory computer readable memory storing instructions that, when executed on a processor, cause the processor to:
determine a mean square error $\sigma_h^2$ of an estimate h of a communication channel via which signals are received by a communication device;
receive a data symbol y, wherein the received data symbol y corresponds to a data symbol x transmitted over the communication channel; and
determine a likelihood value for a bit in the transmitted data symbol x, wherein the instructions cause the processor to determine the likelihood value for the bit in the transmitted data symbol x at least by (i) calculating a quantity according to $$e^{\frac{-|y-hx|^2}{\sigma_z^2 + \sigma_h^2 |x|^2}},$$

where $\sigma_z^2$ is a noise power associated with the communication channel, and (ii) calculating the likelihood value for the bit in the transmitted data symbol x as a function of the calculated quantity.

16. The tangible, non-transitory computer readable memory of claim 15, wherein the instructions cause the processor to calculate the likelihood value for the bit in the transmitted data symbol x at least by calculating a log-likelihood ratio for the bit in the transmitted data symbol x.

17. The tangible, non-transitory computer readable memory of claim 15, wherein the instructions cause the processor to calculate the likelihood value for the bit in the transmitted data symbol x at least by calculating the likelihood value according to $$L(i) = \log \frac{\sum_{x \in S_{1,i}} \frac{1}{(\sigma_z^2 + \sigma_h^2 |x|^2)\pi} e^{\frac{-|y-hx|^2}{\sigma_z^2 + \sigma_h^2 |x|^2}}}{\sum_{x \in S_{0,i}} \frac{1}{(\sigma_z^2 + \sigma_h^2 |x|^2)\pi} e^{\frac{-|y-hx|^2}{\sigma_z^2 + \sigma_h^2 |x|^2}}}$$

where $S_{1,i}$ is a set of all possible transmitted data symbols x with bit i equal to 1, and $S_{0,i}$ is a set of all possible transmitted data symbols x with bit i equal to 0.

18. The tangible, non-transitory computer readable memory of claim 15, wherein the instructions cause the processor to calculate the likelihood value for the bit in the transmitted data symbol x at least by calculating the likelihood value according to $$L(i) = \max_{x \in S_{1,i}} \log \frac{e^{\frac{-|y-hx|^2}{\sigma_z^2 + \sigma_h^2 |x|^2}}}{(\sigma_z^2 + \sigma_h^2 |x|^2)\pi} \max_{x \in S_{0,i}} \log \frac{e^{\frac{-|y-hx|^2}{\sigma_z^2 + \sigma_h^2 |x|^2}}}{(\sigma_z^2 + \sigma_h^2 |x|^2)\pi}$$

$$x \in S_{1,i} \qquad x \in S_{0,i}$$

where $S_{1,i}$ is a set of all possible transmitted data symbols x with bit i equal to 1, and $S_{0,i}$ is a set of all possible transmitted data symbols x with bit i equal to 0.

19. The tangible, non-transitory computer readable memory of claim 15, wherein the instructions further cause the processor to determine the estimate h of the communication channel.

20. The tangible, non-transitory computer readable memory of claim 15, wherein:
the communication channel includes a plurality of channels corresponding to a plurality of spatial streams; and
the data symbol y includes a data symbol vector that (i) corresponds to a transmitted data symbol vector that includes a plurality of transmitted data symbols, and (ii) includes a plurality of data symbols received in parallel via the plurality of spatial streams.

\* \* \* \* \*